US012659344B2

(12) United States Patent
Hulick, Jr. et al.

(10) Patent No.: US 12,659,344 B2
(45) **Date of Patent: *Jun. 16, 2026**

(54) OPENTELEMETRY SECURITY SYSTEMS AND METHODS

(71) Applicant: Cisco Technology, Inc., San Jose, CA (US)

(72) Inventors: Walter T. Hulick, Jr., Pearland, TX (US); Ashutosh Kulshreshtha, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/007,834

(22) Filed: Jan. 2, 2025

(65) Prior Publication Data

US 2025/0133105 A1    Apr. 24, 2025

Related U.S. Application Data

(63) Continuation of application No. 17/823,256, filed on Aug. 30, 2022, now Pat. No. 12,192,224.

(51) Int. Cl.
H04L 9/40        (2022.01)

(52) U.S. Cl.
CPC ...... H04L 63/1433 (2013.01); H04L 63/1416 (2013.01)

(58) Field of Classification Search
CPC ............. H04L 63/1433; H04L 63/1416; G06F 21/552
See application file for complete search history.

(56) References Cited

U.S. PATENT DOCUMENTS

| | | | |
|---|---|---|---|
| 11,030,068 | B1 | 6/2021 | Agarwal et al. |
| 2017/0230410 | A1 | 8/2017 | Hassanzadeh et al. |
| 2018/0324052 | A1 | 11/2018 | Nachimuthu et al. |

(Continued)

FOREIGN PATENT DOCUMENTS

| | | |
|---|---|---|
| WO | 2022086610 A1 | 4/2022 |
| WO | 2022111154 A1 | 6/2022 |

OTHER PUBLICATIONS

International Search Report and Written Opinion for International Application No. PCT/US2023/030690, mailed Dec. 8, 2023, 13 Pages.

(Continued)

*Primary Examiner* — Lynn D Feild
*Assistant Examiner* — Abdullah Alamamun
(74) *Attorney, Agent, or Firm* — Baker Botts L.L.P.

(57) ABSTRACT

According to some embodiments, a method includes detecting a start of an OpenTelemetry span by an application and determining security information related to the start of the OpenTelemetry span. The method further includes monitoring the application for one or more application behaviors during execution of the OpenTelemetry span. The method further includes detecting an end of the OpenTelemetry span by the application, and in response, calculate a security score for the OpenTelemetry span using the security information related to the start of the OpenTelemetry span and the one or more application behaviors detected during execution of the OpenTelemetry span. The method further includes updating a status of the OpenTelemetry span to include the security score and a text string related to the calculation of the security score.

20 Claims, 8 Drawing Sheets

(56)    References Cited

U.S. PATENT DOCUMENTS

| | | |
|---|---|---|
| 2019/0108342 A1 | 4/2019 | Conikee et al. |
| 2021/0232485 A1 | 7/2021 | Agarwal et al. |
| 2021/0248023 A1 | 8/2021 | Brown |
| 2022/0050902 A1 | 2/2022 | Hulick, Jr. |
| 2022/0141201 A1 | 5/2022 | Lal et al. |
| 2022/0172037 A1 | 6/2022 | Kang et al. |
| 2023/0376591 A1 | 11/2023 | Kim et al. |

OTHER PUBLICATIONS

Krohling J.P., "Securing your Open Telemetry Collector," Nov. 14, 2020, Published in Open Telemetry, pp. 1-14.

Maruf A.A., et al., "Using Microservice Telemetry Data for System Dynamic Analysis", arxiv.org, Cornell University Library, 201 Olin Library Cornell University Ithaca, NY 14853, Jul. 6, 2022, XP091266312, 10 Pages.

Sharma A., "Adding security workflows to OpenTelemetry," Aug. 9, 2021, WS Open Source Blog, pp. 1-5.

Office Action for European Application No. 23765393.6, dated Dec. 2, 2025, 48 Pages.

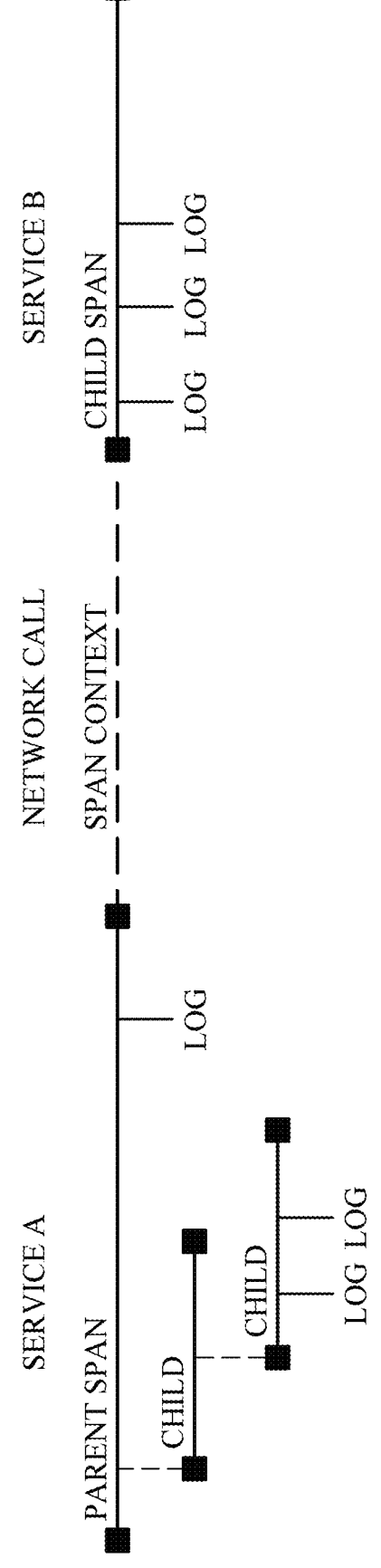

1. TRACE: THE DESCRIPTION OF A TRANSACTION AS IT MOVES THROUGH A DISTRIBUTED SYSTEM.
2. SPAN: A NAMED, TIMED OPERATION REPRESENTING A PIECE OF THE WORKFLOW. SPANS ACCEPT KEY.VALUE TAGS AS WELL AS FINE-GRAINED, TIMESTAMPED, STRUCTURED LOGS ATTACHED TO THE PARTICULAR SPAN INSTANCE.
3. SPAN CONTEXT: TRACE INFORMATION THAT ACCOMPANIES THE DISTRIBUTED TRANSACTION, INCLUDING WHEN IT PASSES THE SERVICE TO SERVICE OVER THE NETWORK OR THROUGH A MESSAGE BUS. THE SPAN CONTEXT CONTAINS THE TRACE IDENTIFIER, SPAN IDENTIFIER, AND ANY OTHER DATA THAT THE TRACING SYSTEM NEEDS TO PROPAGATE TO THE DOWNSTREAM SERVICE.

*FIG. 6*

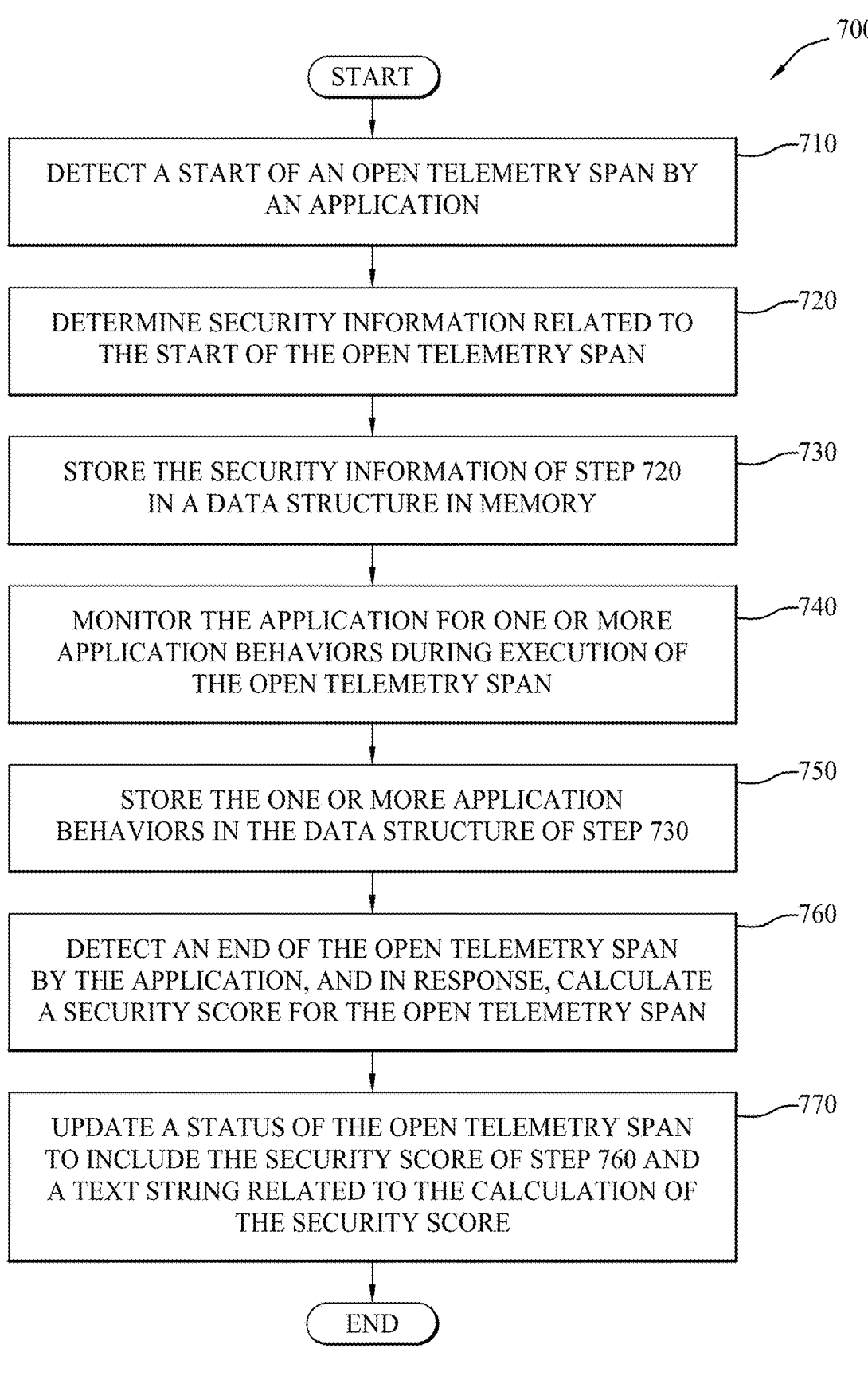

*700*

START

DETECT A START OF AN OPEN TELEMETRY SPAN BY AN APPLICATION —710

DETERMINE SECURITY INFORMATION RELATED TO THE START OF THE OPEN TELEMETRY SPAN —720

STORE THE SECURITY INFORMATION OF STEP 720 IN A DATA STRUCTURE IN MEMORY —730

MONITOR THE APPLICATION FOR ONE OR MORE APPLICATION BEHAVIORS DURING EXECUTION OF THE OPEN TELEMETRY SPAN —740

STORE THE ONE OR MORE APPLICATION BEHAVIORS IN THE DATA STRUCTURE OF STEP 730 —750

DETECT AN END OF THE OPEN TELEMETRY SPAN BY THE APPLICATION, AND IN RESPONSE, CALCULATE A SECURITY SCORE FOR THE OPEN TELEMETRY SPAN —760

UPDATE A STATUS OF THE OPEN TELEMETRY SPAN TO INCLUDE THE SECURITY SCORE OF STEP 760 AND A TEXT STRING RELATED TO THE CALCULATION OF THE SECURITY SCORE —770

END

*FIG. 7*

OPENTELEMETRY SECURITY SYSTEMS AND METHODS

PRIORITY

This nonprovisional application is a continuation under 35 U.S.C. § 120 of U.S. patent application Ser. No. 17/823,256 filed on Aug. 30, 2022 and entitled "Opentelemetry Security Systems and Methods" which is hereby incorporated by reference in its entirety.

TECHNICAL FIELD

This disclosure generally relates to OpenTelemetry, and more specifically to OpenTelemetry security systems and methods.

BACKGROUND

OpenTelemetry is the core technology behind next generation Full Stack Observability and provides a mechanism to gather metrics, to do end-to-end tracing, and to provide intelligent log harvesting. OpenTelemetry represents a massive shift from proprietary application monitoring systems, such as application performance monitoring (APM) solutions, to an infrastructure that leverages application programming interfaces (APIs) that are standardized and open. OpenTelemetry is also quickly becoming an important cornerstone of the Cloud Native Computing Foundation. However, OpenTelemetry today is solely focused on application performance purposes.

BRIEF DESCRIPTION OF THE DRAWINGS

For a more complete understanding of the disclosed embodiments and their features and advantages, reference is now made to the following description, taken in conjunction with the accompanying drawings, in which:

FIG. 6 illustrates an example of a distributed transaction, according to some embodiments; and FIG. 7 illustrates an example method for determining and reporting a security score for an OpenTelemetry span, according to some embodiments.

DESCRIPTION OF EXAMPLE EMBODIMENTS

Overview

Figure 1A:
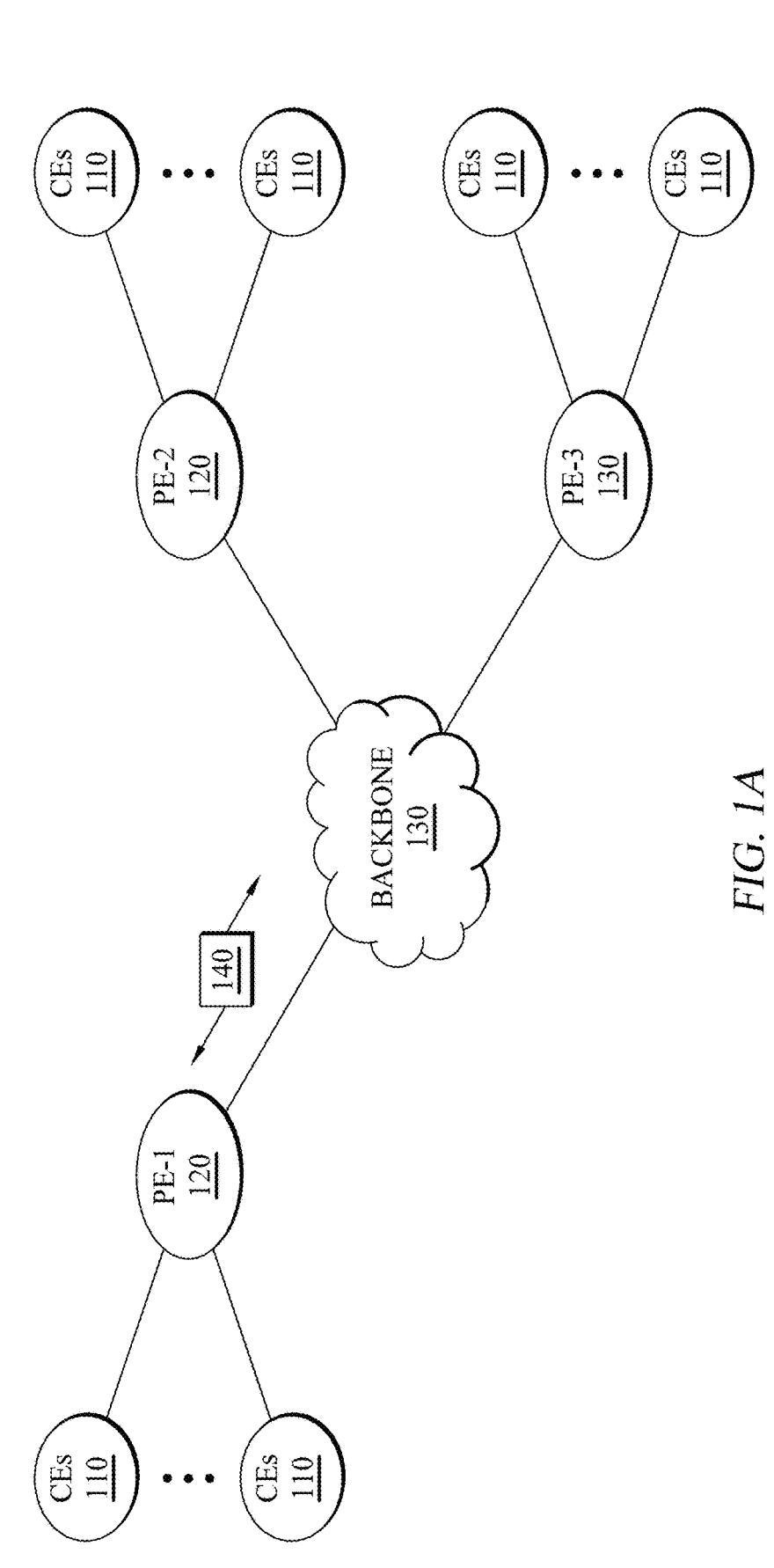
FIGS. 1A-1B illustrate example computer networks, according to some embodiments.

The present disclosure relates generally to systems and methods for adding security to OpenTelemetry. According to one or more embodiments of the disclosure, a method includes detecting a start of an OpenTelemetry span by an application and determining security information related to the start of the OpenTelemetry span. The method further includes monitoring the application for one or more application behaviors during execution of the OpenTelemetry span. The method further includes detecting an end of the OpenTelemetry span by the application, and in response, calculating a security score for the OpenTelemetry span using the security information related to the start of the OpenTelemetry span and the one or more application behaviors detected during execution of the OpenTelemetry span. The method further includes updating a status of the OpenTelemetry span to include the security score and a text string related to the calculation of the security score. Other embodiments are described below, and this overview is not meant to limit the scope of the present disclosure.

Technical advantages of certain embodiments of this disclosure may include one or more of the following. Certain systems and methods described herein provide systems and methods for adding security to OpenTelemetry. Unlike existing solutions where OpenTelemetry is used solely for monitoring application performance, embodiments of this disclosure provide systems and methods that analyze security information for an OpenTelemetry span as well as application behaviors during execution of the span and then calculate a security score for the span. The security score and a text string (e.g., a JSON Web Token (JWT)) is then added to the span status using, for example, the setStatus OpenTelemetry API call. By determining and reporting security scores for each span within a trace, systems can more accurately determine and report any security issues with transactions. Furthermore, systems may be able to take automatic actions to mitigate any security issues discovered in the OpenTelemetry span (e.g., adjust firewall settings, etc.) Other technical advantages will be readily apparent to one skilled in the art from the following figures, descriptions, and claims. Moreover, while specific advantages have been enumerated above, various embodiments may include all, some, or none of the enumerated advantages.

Example Embodiments

The present disclosure relates generally to OpenTelemetry security systems and methods. OpenTelemetry is the core technology behind next generation Full Stack Observability and provides a mechanism to gather metrics, to do end-to-end tracing, and to provide intelligent log harvesting. OpenTelemetry represents a massive shift from proprietary application monitoring systems, such as application performance monitoring (APM) solutions, to an infrastructure that leverages application programming interfaces (APIs) that are standardized and open. OpenTelemetry is also quickly becoming an important cornerstone of the Cloud Native Computing Foundation. However, OpenTelemetry today is solely focused on application performance purposes, but not on security.

To address these and other problems associated with OpenTelemetry, the enclosed embodiments provide OpenTelemetry security systems and methods. To do so, systems described herein detect a start of an OpenTelemetry span by an application and then determine security information related to the start of the OpenTelemetry span. The systems further monitor the application for one or more application behaviors during execution of the OpenTelemetry span. The systems further detect an end of the OpenTelemetry span by the application, and in response, calculate a security score for the OpenTelemetry span using the security information related to the start of the OpenTelemetry span and the one or more application behaviors detected during execution of the OpenTelemetry span. The systems further update a status of the OpenTelemetry span to include the security score and a text string related to the calculation of the security score.

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
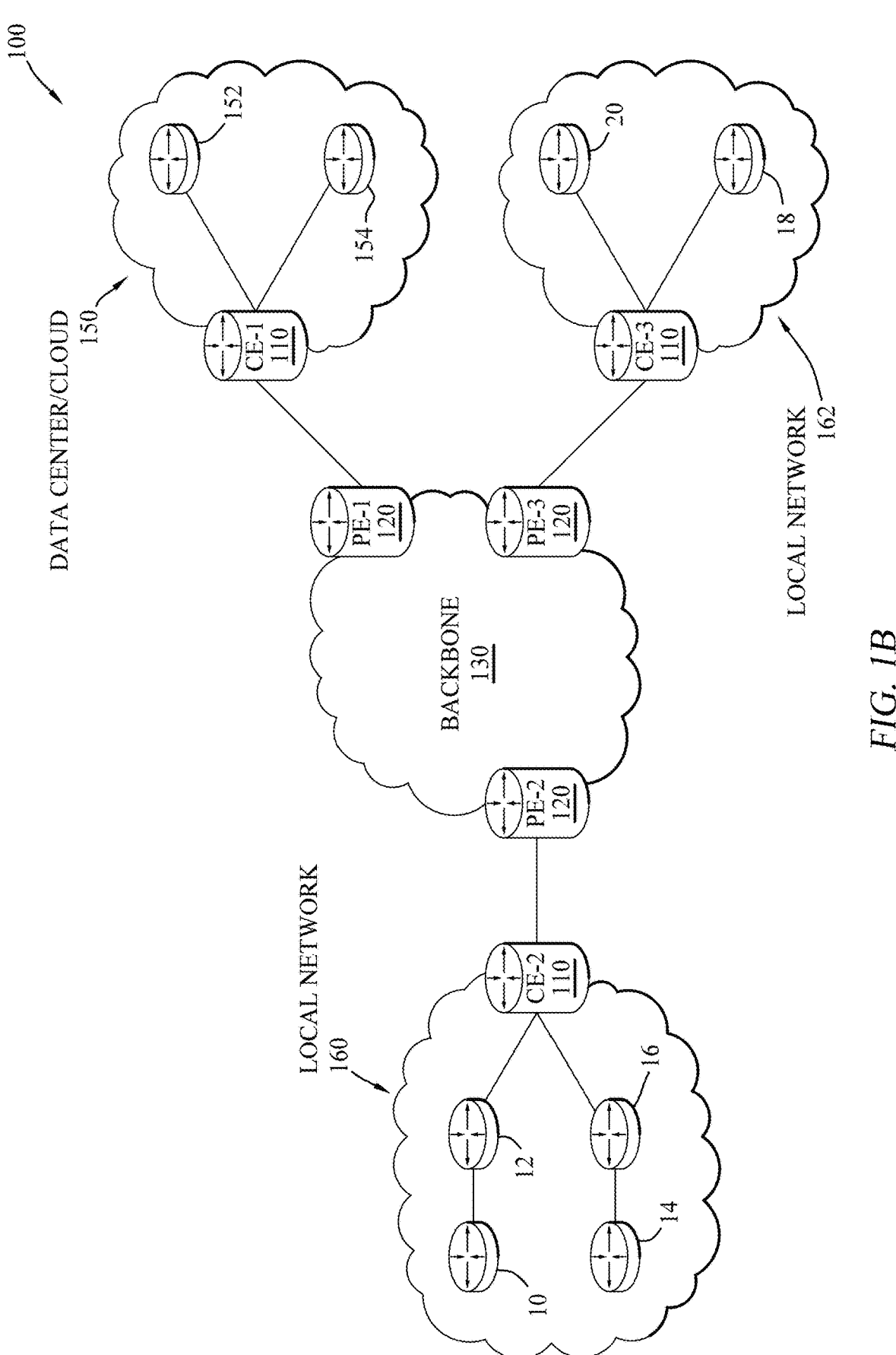

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
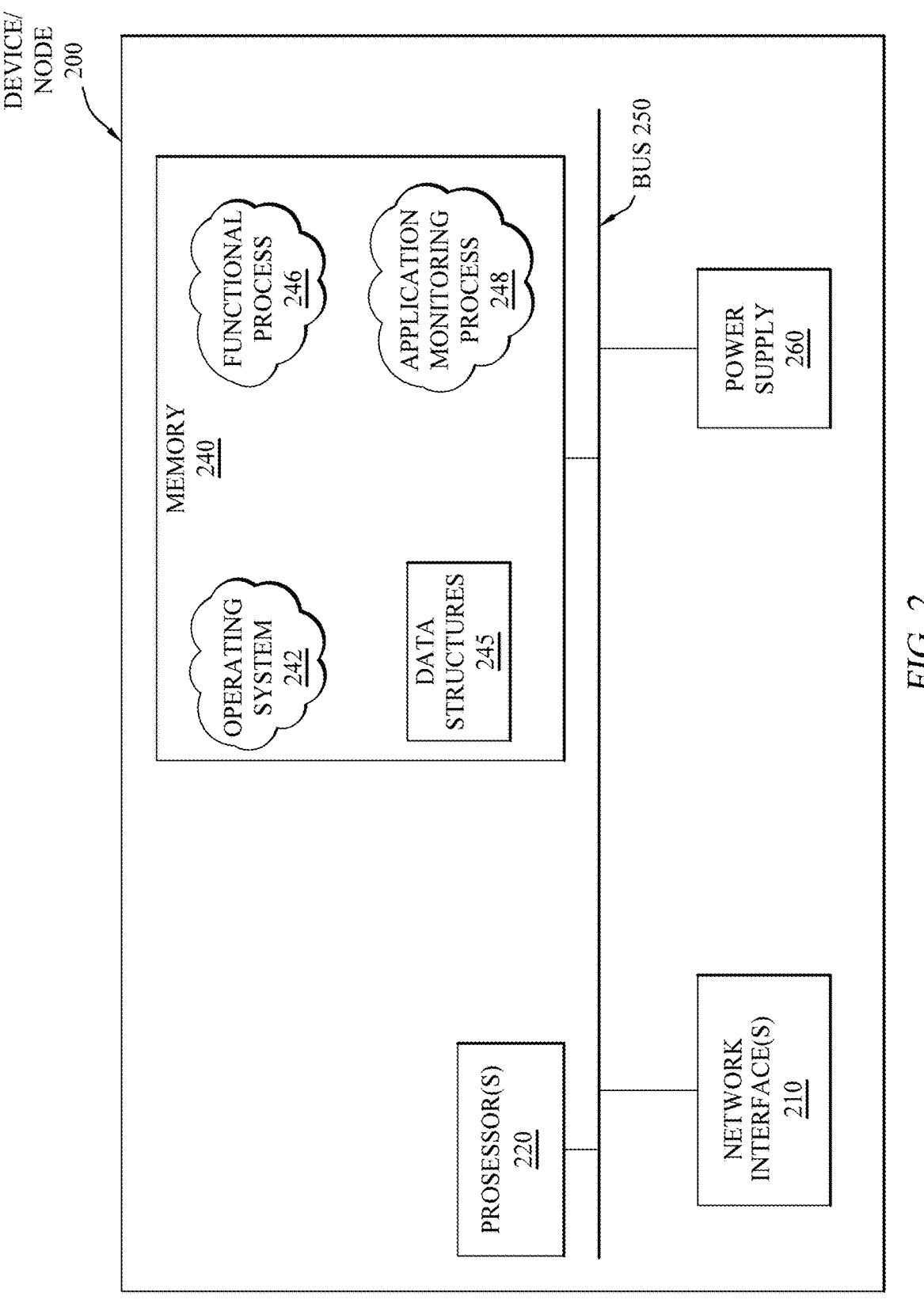
FIG. 2 illustrates an example computing device/node, according to some embodiments.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210

(e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections via network interface(s) 210, e.g., wireless and wired/physical connections, and that the view herein is merely for illustration. Also, while network interface(s) 210 are shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative monitoring process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Application Intelligence Platform

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
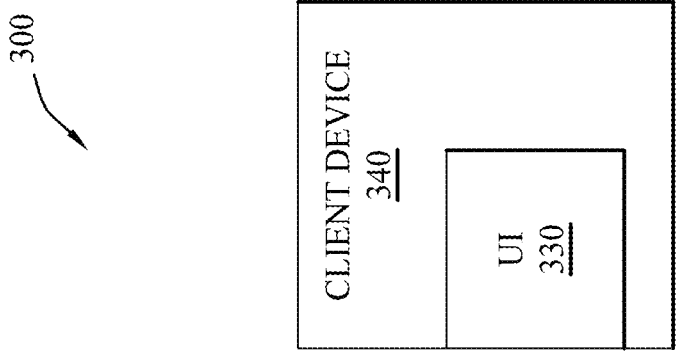
FIG. 3 illustrates an example application intelligence platform, according to some embodiments.
Figure 3:
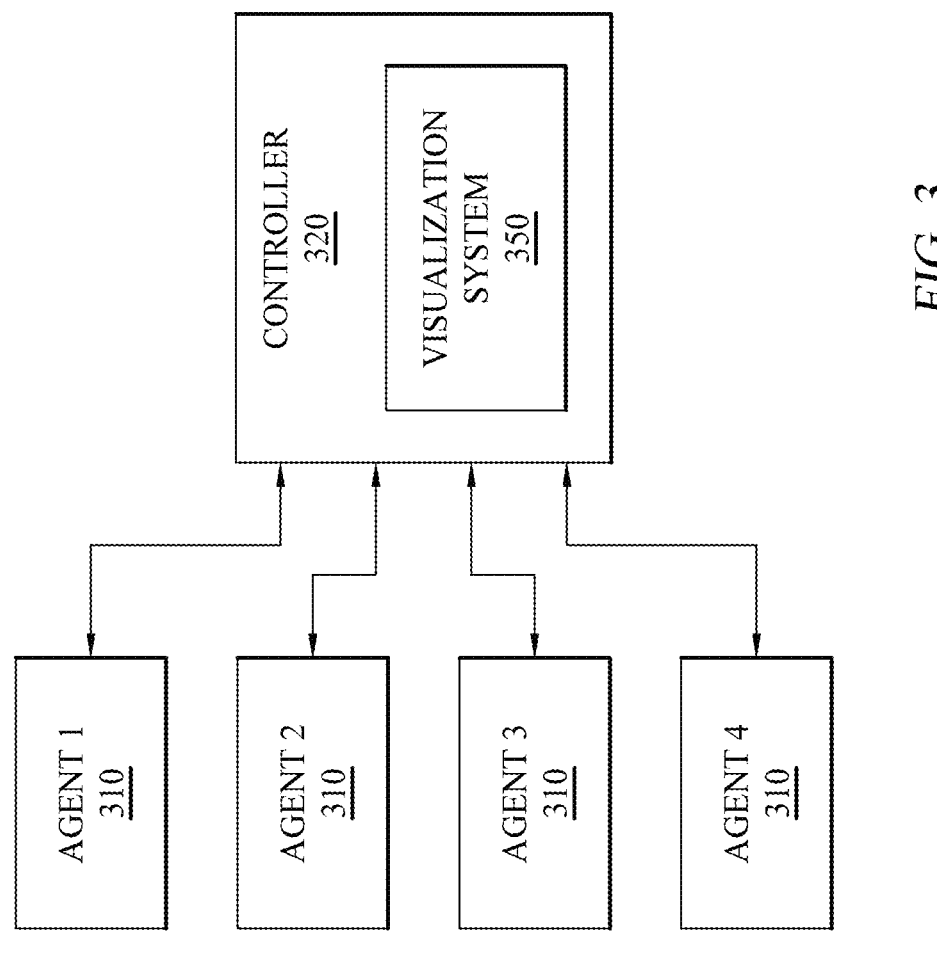

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance may be hosted remotely by a provider of the application intelligence platform 300. In an illustrative on-premises (On-Prem) implementation, a controller instance may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than one hundred calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the extensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
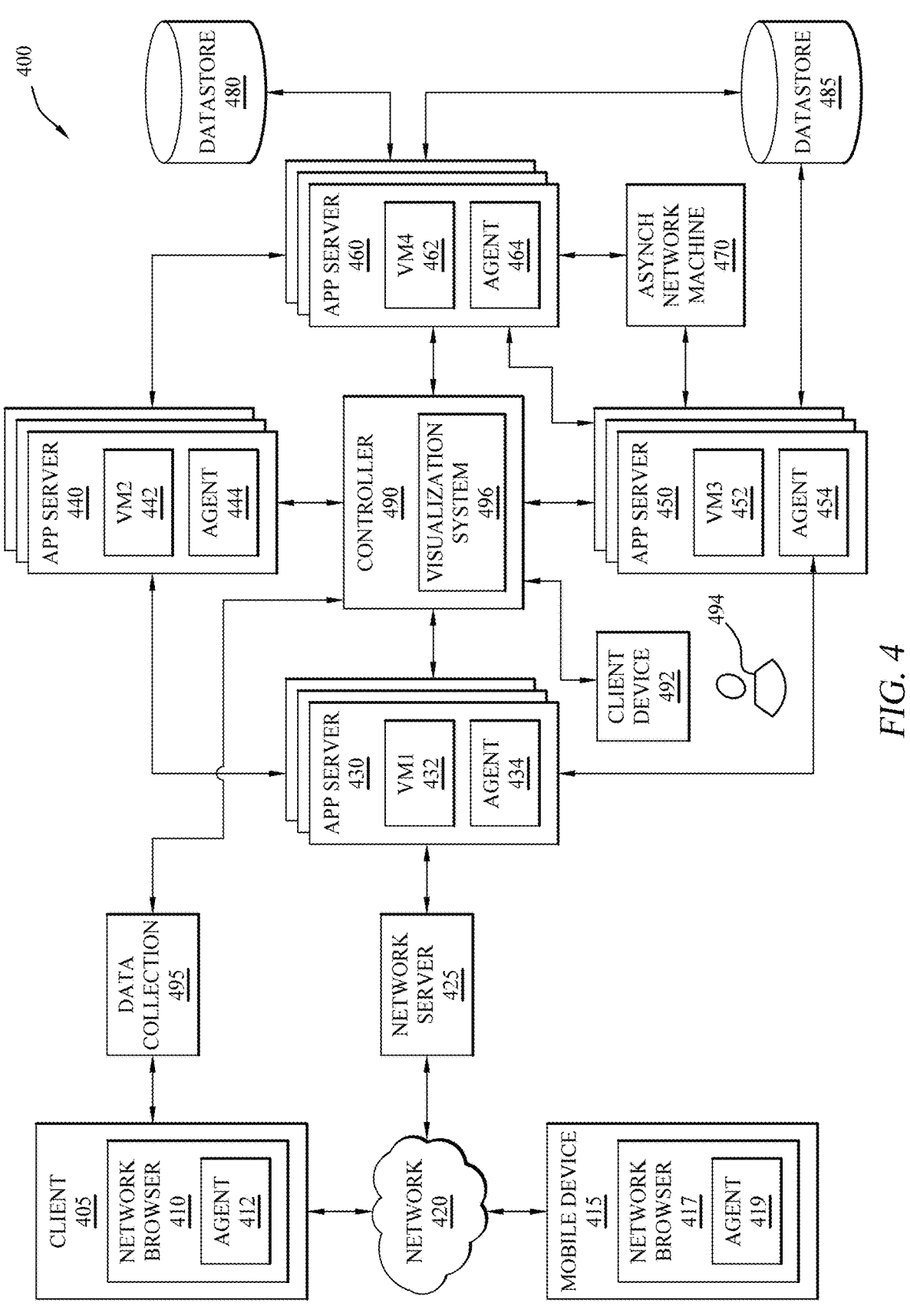
FIG. 4 illustrates an example system for implementing the example application intelligence platform of FIG. 3, according to some embodiments.

FIG. 4 illustrates an example application intelligence platform (system) 400 for performing one or more aspects of the techniques herein. The system 400 in FIG. 4 includes client 405, client device 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection server 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor application 432 running in a virtual machine (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or mobile device 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client device 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
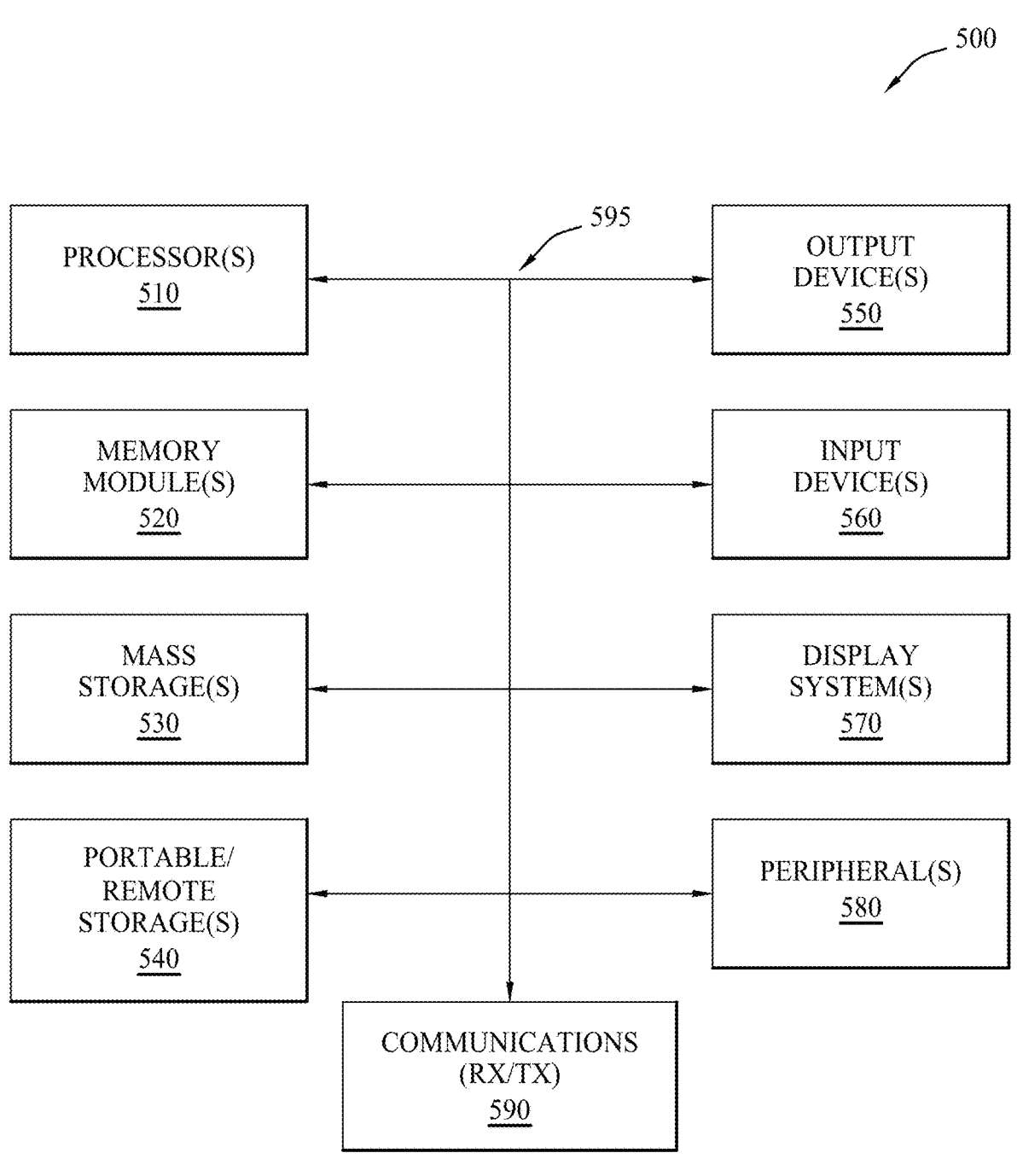
FIG. 5 illustrates an example computing system, according to some embodiments.

FIG. 5 is a block diagram of a computer system 500 for implementing the present technology, which is a specific implementation of device 200 of FIG. 2 above. System 500 of FIG. 5 may be implemented in the contexts of the likes of client 405, client device 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processor(s) 510 and memory 520. Main memory 520 stores, in part, instructions and data for execution by processor(s) 510. Main memory 520 can store the executable code when in operation. The system 500 of FIG. 5 further includes a mass storage device 530, portable/remote storage(s) 540, output devices 550, user input devices 560, display system(s) 570, and peripheral(s) 580.

The components shown in FIG. 5 are depicted as being connected via a single bus 590. However, the components may be connected through one or more data transport means. For example, processor(s) 510 and main memory 520 may be connected via a local microprocessor bus, and the mass storage device 530, peripheral(s) 580, storage(s) 540, and display system(s) 570 may be connected via one or more input/output (I/O) buses.

Mass storage device 530, which may be implemented with a magnetic disk drive or an optical disk drive, is a non-volatile storage device for storing data and instructions for use by processor(s) 510. Mass storage device 530 can store the system software for implementing embodiments of the present disclosure for purposes of loading that software into main memory 520.

Portable/remote storage(s) 540 may operate in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the storage(s) 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550.

Examples of suitable output devices include speakers, printers, network interfaces, and monitors.

Display system(s) 570 may include a liquid crystal display (LCD) or other suitable display device. Display system(s) 570 receives textual and graphical information, and processes the information for output to the display device.

Peripheral(s) 580 may include any type of computer support device to add additional functionality to the computer system. For example, peripheral(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

As noted above, OpenTelemetry represents a massive shift from proprietary application monitoring systems, such as application performance monitoring (APM) solutions, to an infrastructure that leverages application programming interfaces (APIs) that are standardized and open. OpenTelemetry is also quickly becoming an important cornerstone of the Cloud Native Computing Foundation.

In general, OpenTelemetry is the merging of OpenTracing and OpenCensus, which are two different open source standards projects which conflicted with each other. Essentially, the 'merged' technology of OpenTelemetry is focused on 'Cloud Native Computing' environments and is now part of the Cloud Native Computing Foundation (CNCF). Open-Telemetry represents a huge paradigm shift for Application Monitoring and specifically Application Tracing. By far the most popular and heavily supported platform for OpenTelemetry is Java.

To better illustrate the teachings herein, the following terminology is used.

Trace: a record of activity for a request through a distributed system. A trace is often represented as a Directed Acyclic Graph (DAG) of spans.

Spans: named, timed operations representing a single operation within a trace (e.g., a piece of the workflow). Spans can be nested to form a trace tree. Each trace contains a root span, which typically describes the end-to-end latency and (optionally) one or more sub-spans for its sub-operations. Spans also accept key: value tags as well as fine-grained, timestamped, structured logs attached to a particular span instance.

Metrics: a raw measurement about a service that are captured at runtime. OpenTelemetry defines three metric instruments: counter, measure, and observer. An observer supports an asynchronous API collecting metric data on-demand, once per collection interval.

Span Context: a span includes a span context, which is a set of globally unique identifiers that represent the unique request to which each span belongs, representing the data required for moving trace information across service boundaries. Said differently, a span context includes trace information that accompanies a distributed transaction, including when it passes the service to service over the network or through a message bus. Typically, a span context includes the trace identifier, span identifier, and any other data that the tracing system needs to propagate to the downstream service. OpenTelemetry also supports the correlation context which can carry any user-defined properties. A correlation context is not required, and components may choose not to carry or store this information.

Context Propagation: the means by which context is bundled and transferred between services, typically via HTTP headers. Context propagation is a key part of the OpenTelemetry system, and has some interesting use cases beyond tracing, such as for A/B testing. Note that OpenTelemetry supports multiple protocols for context propagation and to avoid issues, it is important that a single method be used throughout an application. So, for instance, if the W3C specification is used in one service, it should be used throughout the complete system. These are the currently supported options: W3C Trace-Context HTTP Propagator, W3C Correlation-Context HTTP Propagator, and B3 Zipkin HTTP Propagator.

FIG. 6 illustrates an example of a distributed transaction 600, according to various embodiments. As shown, assume that distributed transaction 600 begins at a first service, Service A, and is handed off via a network call to a second service, Service B, as time progresses. In such a case, tracing distributed transaction 600 using OpenTelemetry will result in a parent span for the execution of distributed transaction 600 by Service A that spans several child spans. In addition, the network call to pass distributed transaction 600 to Service B will also result in a span context. This allows the tracing of distributed transaction 600 to continue as a child span of the parent span that began at Service A.

Unfortunately, OpenTelemetry today is solely focused on application performance and not on security. More specifically, OpenTelemetry seeks to merge the tracing, metrics, and logging functions from OpenTracing and OpenCensus into a single, cohesive package under the CNCF. In this context, (distributed) tracing provides insight into the full lifecycles (e.g., traces) of requests to the system, allowing failures and performance issues to be identified. Metrics provide quantitative information regarding executed processes of the system, such as gauges, histograms, and counters. Logging, in turn, provides insight into messages sent by processes that are application-specific. These three functions are also often interrelated. For instance, a subset of misbehaving traces can be identified by looking at metrics. Similarly, analysis of the logs can reveal the root cause of the behavior. New metrics can also be introduced to identify the issue earlier in time.

According to various embodiments, the systems and methods described herein add security to OpenTelemetry. Unlike existing solutions where OpenTelemetry is used solely for monitoring application performance, embodiments of this disclosure provide systems and methods that analyze security information for an OpenTelemetry span as well as application behaviors during execution of the span and then calculate a security score for the span. The security score and a text string (e.g., a JWT) is then added to the span status using, for example, the setStatus OpenTelemetry API call. By determining and reporting security scores for each span within a trace, systems can more accurately determine and report any security issues with transactions. Furthermore, systems may be able to take automatic actions to mitigate any security issues discovered in the OpenTelemetry span (e.g., adjust firewall settings, etc.). A specific method that may be utilized by certain embodiments to calculate and report a security score for the span are discussed below in reference to FIG. 7.

FIG. 7 illustrates a method 700 for determining and reporting a security score for an OpenTelemetry span, according to some embodiments. In some embodiments, method 700 may be performed by any computer system or device described herein. Method 700 may begin in step 710 where method 700 detects a start of an OpenTelemetry span by an application. For example, instrumentation may be added to a system to automatically detect when an application begins or creates an OpenTelemetry span.

In step 720, method 700 determines security information related to the start of the OpenTelemetry span. The security information may be, for example, one or more of a location where a transaction of the span originated, an identification of a user associated with the transaction, a type of the transaction, or a status of a parent span. In some embodiments, the security information collected in step 720 depends on whether or not the span is a parent span or a child span. If the span is a parent span, the instrumentation may analyze the TraceState for the span in order to determine security information such as where a transaction of the span originated (e.g., derived from an IP address), an identification of a user associated with the transaction (e.g., the user account role and privileges such as an admin, etc.), and a type of the transaction (e.g., business transaction sensitivity such as browse, checkout, etc.). If the span is a child span, the security information may be gathered using instrumentation. For example, the instrumentation may determine the status of the caller span (i.e., the parent span) via the SpanContext OpenTelemetry command. This propagates downstream in the OpenTelemetry pipeline via the OLTP protocol.

In step 730, method 700 stores the security information of step 720 in a data structure in memory. In some embodiments, the data structure is a hashtable. In some embodiments, the hashtable uses the current span object as a key and a span security structure tracking span execution items, as discussed in more detail below.

In step 740, method 700 monitors the application for one or more application behaviors during execution of the OpenTelemetry span. In general, this step is for monitoring for any application behaviors that could affect the span security score discussed in more detail below with respect to step 760. In some embodiments, the application behaviors that are monitored in step 740 may include a security exception interception, a class that is executed during various stages in the OpenTelemetry span (determined, for example, using call stack sampling), a permission request made during the OpenTelemetry span, or a computing environment in which the span is executed (e.g., behind a firewall, Internet facing, etc.). In step 750, method 700 stores the one or more application behaviors in the data structure of step 730.

In step 760, method 700 detects an end of the OpenTelemetry span by the application, and in response, calculates a security score for the OpenTelemetry span. The security score is based on the security information related to the start of the OpenTelemetry span from step 720 and the one or more application behaviors detected during execution of the OpenTelemetry span of step 740. In general, the security score is propagated through the pipeline and will show up in the span in the backend tied to the span status. In some embodiments, the span security score is calculated using a scoring or rating system that is based on points that can be adjusted or customized based on customer preference. In some embodiments, the span security score is adjusted based on the caller span score. As a specific example, the overall span security score may be calculated using the following points system:

1-5 points for security exceptions (e.g., depending on the severity of the security exception using a table of all security exception types)

CVSS (e.g., as seen by the national vulnerability database (https://nvd.nist.gov/)) to provide score points for any class executing in a library with a CVE CVSS (e.g., as seen by the national vulnerability database (https://nvd.nist.gov/)) to provide score points*5 for any method executing in a library with a CVE 1-3 points depending on any permission requests made during the span 1-50 points depending on the execution environment of the span In step 770, method 700 updates a status of the OpenTelemetry span to include the security score of step 760 and a text string related to the calculation of the security score. In some embodiments, updating the status of the OpenTelemetry span includes executing an OpenTelemetry setStatus command. In OpenTelemetry, the setStatus API call is as follows: Span setStatus (StatusCode statusCode, String description). In step 770, the security code of step 760 may be inserted as the statusCode of the setStatus command (i.e., in place of the typical OpenTelemetry options of UNSET, OK, or ERROR). In addition, a text string related to the calculation of the security score is inserted as the string description of the setStatus command. In some embodiments, the text string related to the calculation of the security score is a JSON Web Token (JWT). In some embodiments, the JWT is an uncompressed, unencrypted JWT. In some embodiments, an extended mode would allow for individual instances of exceptions, permissions, and the like to be part of the JWT depending on user preference. As a specific example, the JWT may include the following information:

score-points: Span Score exception-points: points from exceptions cvss-class-points: points from class use in a lib with a CVE cvss-method-exploit-points: points from a method named in a CVE permission-points: points from permission requests parent-span-points: points based on the caller/parent trace-span-points: points based on what is seen in the SpanContext TraceState Once the text string (e.g., the JWT) is inserted into the span status, it would be up to the backend to interpret the text string and then use that information further. For example, the information in the span status may be graphically presented to a user in order to alert the user to any spans that may be a security risk. Furthermore, some embodiments may take automatic security actions based on the information in the span status. For example, certain embodiments may take actions to increase security such as increasing security settings on computing systems (e.g., firewalls).

In some embodiments, method 700 may end after step 770. In other embodiments, method 700 may remove a span security entry for a span from the hashtable after step 770. Also, at the end of the span, the TraceState may be changed in some embodiments to enable sampling to ensure that the trace and all downstream traces were sent to the backend processing system.

At the end of a trace, a backend system processes all spans and their TraceState information to determine which spans could potentially be vulnerable in the transaction and take appropriate steps to improve and/or upgrade those spans based on what is found.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. A system, comprising:

one or more processors; and one or more computer-readable non-transitory storage media coupled to the one or more processors and including instructions that, when executed by the one or more processors, cause the system to perform operations comprising:

detecting a start of an OpenTelemetry span by an application;

determining security information associated to the start of the OpenTelemetry span;

during execution of the OpenTelemetry span, monitoring the application for one or more application behaviors;

calculating a security score for the OpenTelemetry span using:

the security information associated to the start of the OpenTelemetry span; and the one or more application behaviors detected during the execution of the OpenTelemetry span;

determining one or more potential security issues for the OpenTelemetry span using a security score; and mitigating the one or more potential security issues for the OpenTelemetry span using the security score.

2. The system of claim 1, the operations further comprising updating a status of the OpenTelemetry span to include:

the security score; and a text string associated with the calculation of the security score.

3. The system of claim 2, wherein:

the text string is a JSON Web Token (JWT); and the JWT indicates one or more of the following:

a number of points from exceptions;

a number of points related to a Common Vulnerabilities and Exposures (CVE);

a number of points from permission requests;

a number of points based on a parent span; or a number of points from an OpenTelemetry TraceState.

4. The system of claim 1, the operations further comprising executing an OpenTelemetry setStatus command, wherein:

the security score is inserted as a status code of the setStatus command; and a text string associated with the calculation of the security score is inserted as string description of the setStatus command.

5. The system of claim 1, the operations further comprising storing the security information and the one or more application behaviors in a data structure.

6. The system of claim 1, wherein the security information associated with the start of the OpenTelemetry span comprises one or more of the following:

a location where a transaction of the OpenTelemetry span originated;

an identification of a user associated with the transaction;

a type of the transaction; or a status of a parent span.

7. The system of claim 1, wherein the one or more application behaviors comprises one or more of:

a security exception interception;

a class that is executed during the OpenTelemetry span;

a permission request made during the OpenTelemetry span; or a computing environment in which the OpenTelemetry span is executed.

8. A method, comprising:

detecting a start of an OpenTelemetry span by an application;

determining security information associated to the start of the OpenTelemetry span;

during execution of the OpenTelemetry span, monitoring the application for one or more application behaviors;

calculating a security score for the OpenTelemetry span using:

the security information associated to the start of the OpenTelemetry span; and the one or more application behaviors detected during the execution of the OpenTelemetry span;

determining one or more potential security issues for the OpenTelemetry span using the security score; and mitigating the one or more potential security issues for the OpenTelemetry span using the security score.

9. The method of claim 8, further comprising updating a status of the OpenTelemetry span to include:

the security score; and a text string associated with the calculation of the security score.

10. The method of claim 9, wherein:

the text string is a JSON Web Token (JWT); and the JWT indicates one or more of the following:

a number of points from exceptions;

a number of points related to a Common Vulnerabilities and Exposures (CVE);

a number of points from permission requests;

a number of points based on a parent span; or a number of points from an OpenTelemetry TraceState.

11. The method of claim 8, further comprising executing an OpenTelemetry setStatus command, wherein:

the security score is inserted as a status code of the setStatus command; and a text string associated with the calculation of the security score is inserted as string description of the setStatus command.

12. The method of claim 8, further comprising storing the security information and the one or more application behaviors in a data structure.

13. The method of claim 8, wherein the security information associated with the start of the OpenTelemetry span comprises one or more of the following:

a location where a transaction of the OpenTelemetry span originated;

an identification of a user associated with the transaction;

a type of the transaction; or a status of a parent span.

14. The method of claim 8, wherein the one or more application behaviors comprises one or more of:

a security exception interception;

a class that is executed during the OpenTelemetry span;

a permission request made during the OpenTelemetry span; or a computing environment in which the OpenTelemetry span is executed.

15. One or more computer-readable non-transitory storage media embodying instructions that, when executed by a processor, cause the processor to perform operations comprising:

detecting a start of an OpenTelemetry span by an application;

determining security information associated to the start of the OpenTelemetry span;

during execution of the OpenTelemetry span, monitoring the application for one or more application behaviors;

calculating a security score for the OpenTelemetry span using:

the security information associated to the start of the OpenTelemetry span; and the one or more application behaviors detected during the execution of the OpenTelemetry span;

determining one or more potential security issues for the OpenTelemetry span using the security score; and mitigating the one or more potential security issues for the OpenTelemetry span using the security score.

16. The one or more computer-readable non-transitory storage media of claim 15, the operations further comprising updating a status of the OpenTelemetry span to include:

the security score; and a text string associated with the calculation of the security score.

17. The one or more computer-readable non-transitory storage media of claim 16, wherein:

the text string is a JSON Web Token (JWT); and the JWT indicates one or more of the following:

a number of points from exceptions;

a number of points related to a Common Vulnerabilities and Exposures (CVE);

a number of points from permission requests;

a number of points based on a parent span; or a number of points from an OpenTelemetry TraceState.

18. The one or more computer-readable non-transitory storage media of claim 15, the operations further comprising executing an OpenTelemetry setStatus command, wherein:

the security score is inserted as a status code of the setStatus command; and a text string associated with the calculation of the security score is inserted as string description of the setStatus command.

19. The one or more computer-readable non-transitory storage media of claim 15, wherein the security information associated with the start of the OpenTelemetry span comprises one or more of the following:

a location where a transaction of the OpenTelemetry span originated;

an identification of a user associated with the transaction;

a type of the transaction; or a status of a parent span.

20. The one or more computer-readable non-transitory storage media of claim 15, wherein the one or more application behaviors comprises one or more of:

a security exception interception;

a class that is executed during the OpenTelemetry span;

a permission request made during the OpenTelemetry span; or a computing environment in which the OpenTelemetry span is executed.

\* \* \* \* \*